(12) United States Patent
Brugler et al.

(10) Patent No.: US 8,990,735 B2
(45) Date of Patent: Mar. 24, 2015

(54) ENHANCED TREE VIEWS OF DATA STRUCTURES

(75) Inventors: Thomas S. Brugler, Fuquay-Varina, NC (US); Vincent C. Conzola, Raleigh, NC (US); Randall A. Craig, Raleigh, NC (US); Todd M. Eischeid, Cary, NC (US); Mark E. Molander, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/412,750

(22) Filed: Mar. 6, 2012

(65) Prior Publication Data

US 2013/0239066 A1    Sep. 12, 2013

(51) Int. Cl.
  *G06F 3/048* (2013.01)
  *G06F 3/0482* (2013.01)
  *G06F 17/30* (2006.01)

(52) U.S. Cl.
  CPC ........ *G06F 17/30994* (2013.01); *G06F 3/0482* (2013.01)
  USPC .......................................... 715/845; 715/818

(58) Field of Classification Search
  CPC .............................. G06F 3/0482; G06F 3/0485
  USPC ......................................................... 715/854
  See application file for complete search history.

(56) References Cited

U.S. PATENT DOCUMENTS 6,938,050 B2 *  8/2005  Le et al. ........................ 707/769
7,392,482 B2 *  6/2008  Firebaugh et al. ............ 715/734
7,447,998 B2   11/2008  Hutcheson et al.
7,519,923 B2    4/2009  Peterson et al.
7,562,298 B2 *  7/2009  Patadia et al. ................. 715/713
7,861,178 B2   12/2010  Lui et al.
7,979,808 B2    7/2011  Stiso
7,983,950 B2    7/2011  De Vita
8,434,015 B2 *  4/2013  Nozaki et al. ................. 715/764
2003/0214538 A1 * 11/2003  Farrington et al. ........... 345/854
2009/0164947 A1  6/2009  Taylor et al.
2009/0216732 A1 *  8/2009  Feng ................................. 707/4
2010/0299327 A1 11/2010  Kiefer et al.
2011/0145712 A1  6/2011  Pontier et al.

FOREIGN PATENT DOCUMENTS

WO      2009154484  A2    12/2009

OTHER PUBLICATIONS

How to Navigate Windows 7 with Windows Explorer Nov. 30, 2009 3 pages.*

(Continued)

*Primary Examiner* — Andrea Long (74) *Attorney, Agent, or Firm* — Jinesh Patel; Jennifer M. Anda (57) ABSTRACT

A computer displays on a user interface a hierarchical view of the data within the tree structure. The tree structure includes a plurality of nodes. The computer receives input via the user interface that at least one node of the plurality of nodes has been selected, wherein the computer sets the at least one node that has been selected as an active node. Responsive to the at least one node that has been selected as an active node, the computer displays on the user interface a selectable display element including one or more navigation elements configured to navigate between sibling nodes, and the computer displays on the user interface data related to the active node.

20 Claims, 11 Drawing Sheets (56) References Cited

OTHER PUBLICATIONS

Brad Miser Viewing and Navigating Mac OS X Finder Windows Apr. 19, 2002 15 pages.*

Beaudoin et al., "Cheops: A Compact Explorer for Complex Hierarchies" Proceedings of the 7th IEEE Visualization Conference (VIS'96), Oct. 27, 1996-Nov. 1, 1996 [online], [retrieved on Aug. 28, 2011]. Retrieved from the Internet <URL: http://ieeexplore.ieee.org/stamp/stamp.jsp?tp=&arnumber=567745>.

Bhalotia et al., "Keyword Searching and Browsing in Databases using BANKS" Proceedings of the 18th International Conference on Data Engineering (ICDE'02) [online], [retrieved on Aug. 26, 2011]. Retrieved from the Internet <URL: http://ieeexplore.ieee.org/stamp/stamp.jsp?tp=&arnumber=994756>.

Chintalapani et al., "Extending the Utility of Treemaps with Flexible Hierarchy" Proceedings of the Eighth International Conference on Information Visualisation (IV'04), Jul. 14-16, 2004 [online], [retrieved on Aug. 28, 2011]. Retrieved from the Internet <URL: http://ieeexplore.ieee.org/stamp/stamp.jsp?tp=&arnumber=1320166>.

Spenke et al., "Visualization of Trees as Highly Compressed Tables with InfoZoom", IEEE Symposium on Information Visualization (InfoVis), 2003, Seattle, Washington [online], [retrieved on Aug. 28, 2011]. Retrieved from the Internet <URL: http://publica.fraunhofer.de/documents/2004958853.html>.

Veit et al., "Model-View-Controller and Object Teams: A Perfect Match of Paradigms", Proceedings of the 2nd International Conference on Aspect-Oriented Software Development, 2003, pp. 140-149 [online], [retrieved on Aug. 26, 2011]. Retrieved from the Internet <URL: http://citeseerx.ist.psu.edu/viewdoc/download?doi=10.1.1.12.5963&rep=rep1&type=pdf>.

Zeeberg et al., "GoMiner: a resource for biological interpretation of genomic and proteomic data", Genome Biology Mar. 25, 2003, vol. 4, Issue 4, Article R28 [online], [retrieved on Aug. 26, 2011]. Retrieved from the Internet <URL: http://www.biomedcentral.com/content/pdf/gb-2003-4-4-r28.pdf>.

* cited by examiner

ENHANCED TREE VIEWS OF DATA STRUCTURES

FIELD OF THE INVENTION

The present invention relates generally to the field of data structures and more particularly to enhanced tree views of data structures.

BACKGROUND OF THE INVENTION

Representational forms of data and data structures are often displayed to a user via a user interface. The forms of the data are "representational" in the sense that data is typically stored in various forms of memory as one or more series of binary signals in electrical and magnetic storage devices, but may be translated into characters (representations), often alphanumeric, comprehensible by users interacting with them. A data structure is a particular way of organizing and storing data in a computer so that it may be used efficiently. Common data structures include arrays, linked lists, tables (e.g., hash-tables), heaps, trees, stacks, and queues.

It is common to use tree structures to represent hierarchical information in software applications, such file folders, database relations, software code class trees, system registries, etc. Such tree structures facilitate access to information by organizing the information in a logical manner. However, as the information to be organized becomes larger and more complex, containing more nodes and more levels in the hierarchy, it becomes difficult to navigate through these levels.

For example, a database typically takes advantage of a tree structure as databases are often administered in a hierarchical manner. Such a tree structure contains a number of (dominant) items, and each item may have an arbitrary number of (subordinate) items. Several interrelated items will typically be grouped under a single dominant item. Subordinate items may be dominant to and contain subordinate items of their own.

In known graphical user interfaces (GUIs), tree views have received wide acceptance for allowing a user the ability to transverse hierarchal data structures (branch objects), and to display an object's content (leaf object). The tree view has a wide acceptance in many software applications, although tree views present a number of usability limitations. Typically, navigating the tree structure is a rather arduous and manual process. To proceed from one location to the next, the user must often expand and/or collapse numerous branches within the tree structure. Furthermore, a tree view only displays the content of a single object at a time.

SUMMARY

Aspects of an embodiment of the present invention disclose a method, computer system, and computer program product for presenting data within a tree structure to a user.

A computer displays on a user interface a hierarchical view of the data within the tree structure. The tree structure includes a plurality of nodes. The computer receives input via the user interface that at least one node of the plurality of nodes has been selected, wherein the computer sets the at least one node that has been selected as an active node. Responsive to the at least one node that has been selected as an active node, the computer displays on the user interface a selectable display element including one or more navigation elements configured to navigate between sibling nodes, and the computer displays on the user interface data related to the active node.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
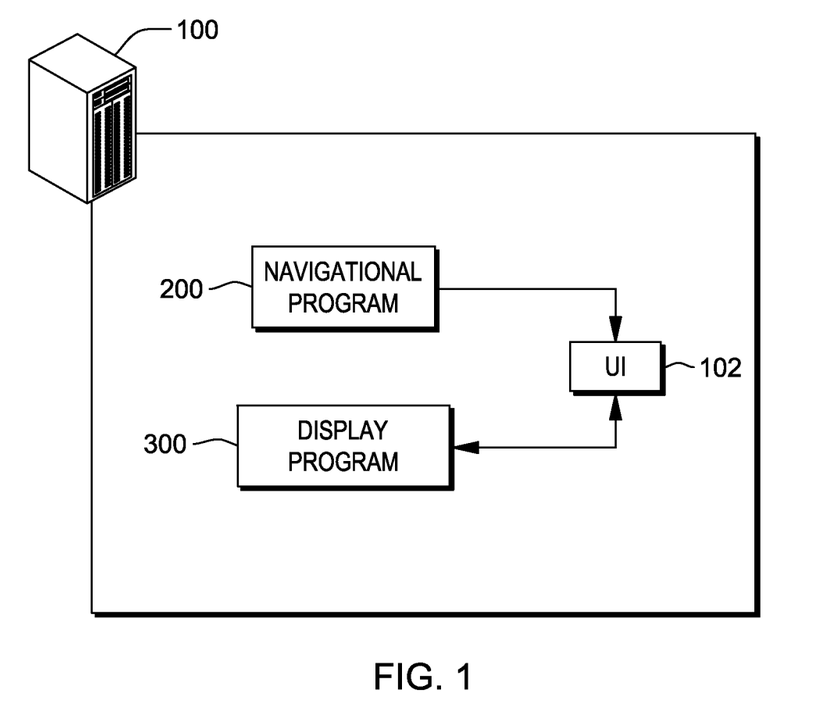
FIG. 1 is a block diagram of a data processing system according to an embodiment of the present invention.

The present invention will now be described in detail with reference to the Figures. FIG. 1 illustrates a data processing system, generally designated 100, according to one embodiment of the present invention.

Data processing system 100 may be a server computer, a client computer, a notebook computer, a laptop computer, a tablet computer, a handheld device or smart-phone, a thin client, or any other electronic device or computing system capable of receiving input from a user, performing computational operations, and displaying data. In another embodiment, data processing system 100 represents a computing system utilizing clustered computers and components to act as a single pool of seamless resources when accessed through a network. This is a common implementation for datacenters and for cloud computing applications.

Data processing system 100 contains user interface (UI) 102 for displaying data, user options, and instructions for operation, and may accept data input and option selections corresponding to data navigational program 200 and data display program 300. UI 102 may be, for example, a graphical user interface (GUI) or a web user interface (WUI). Data processing system 100 executes data navigational program 200 for presenting data within a tree structure to a user. Data associated with a selected node is displayed by the data navigational program 200 in an area of UI 102. Similar data associated with sibling nodes is navigable when data processing system 100 receives a selection of a selectable navigation element. Data processing system 100 also executes data display program 300 for displaying data related to a selected node and/or sibling nodes.

Data processing system 100 can include internal and external components (depicted in FIG. 11) as described in more detail below.

Figure 2:
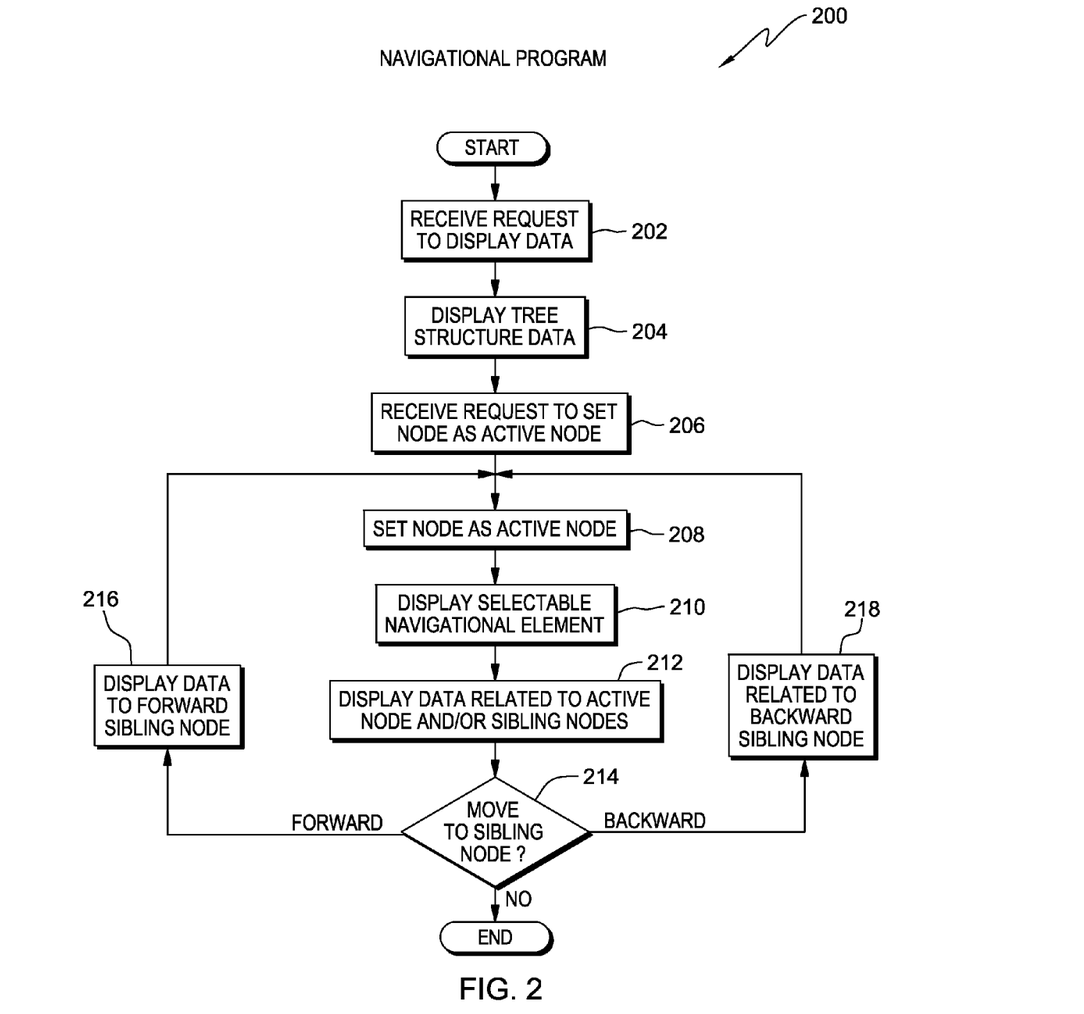
FIG. 2 is a flowchart of the steps of a data navigational program on the data processing system of FIG. 1, in accordance with an embodiment of the present invention.

FIG. 2 is a flowchart depicting the steps of data navigational program 200 for presenting data within a tree structure to a user, in accordance with an embodiment of the present invention.

Data navigational program 200 receives a request to display data (step 202) in UI 102, and in response, the data navigational program 200 displays data (step 204). Data may be displayed in organizational structures including tree structures, lists, tables, etc. In an example, the data is displayed on a first area of UI 102 in a hierarchical view within tree structure. The data is maintained in a database, and is organized and displayed in the tree structure. The tree structure comprises a plurality of nodes that are configured to be expandable and collapsible.

Data navigational program 200 receives input via UI 102 that at least one node has been selected (step 206). Responsive to the input, data navigational program 200 sets the selected node as an active node (step 208). When setting the node as an active node, the data navigational program 200 may indicate that the node is active by highlighting the active node.

In step 210, responsive to when a node is set as an active node, data navigational program 200 displays on the UI 102 a selectable display element including one or more navigation elements configured to navigate between sibling nodes. Additionally, in step 212, responsive to when a node is set as an active node, data navigational program 200 displays on UI 102 data related to the active node and/or one or more sibling nodes. In one example, the data navigational program 200 displays selectable display element in the first area, and displays the data related to the active node and/or one or more sibling nodes in a second area. Although the first and second areas do not overlap in this example, in other examples the different areas of the UI 102 may overlap.

Responsive to step 214, the data navigational program 200 steps forward responsive to when a user interacts with the UI 102 by selecting a second selectable navigational element (step 216). In this example, the data navigational program 200 collapses the first active node and expands and displays similar data in the adjacent sibling node down the tree structure, causing the adjacent sibling node to become a second active node. However, in some examples, the first active node does not collapse when the second active node expands. Furthermore, in some examples, when there are no additional sibling nodes down the tree structure, the data navigational program 200 collapses the first active node and expands and displays similar data in the first sibling node in the same branch of the tree structure.

Responsive to step 214, the data navigational program 200 steps backward responsive to when a user interacts with the UI 102 by selecting a first selectable navigational element (step 218). In this example, the data navigational program 200 collapses the first active node and expands and displays similar data in the adjacent sibling node up the tree structure, causing the adjacent sibling node to become a second active node. However, in some examples, the first active node does not collapse when the second active node expands. Furthermore, in some examples, when there are no additional sibling nodes up the tree structure, the data navigational program 200 collapses the first active node and expands and displays similar data in the last sibling node in the same branch of the tree structure.

Figure 3:
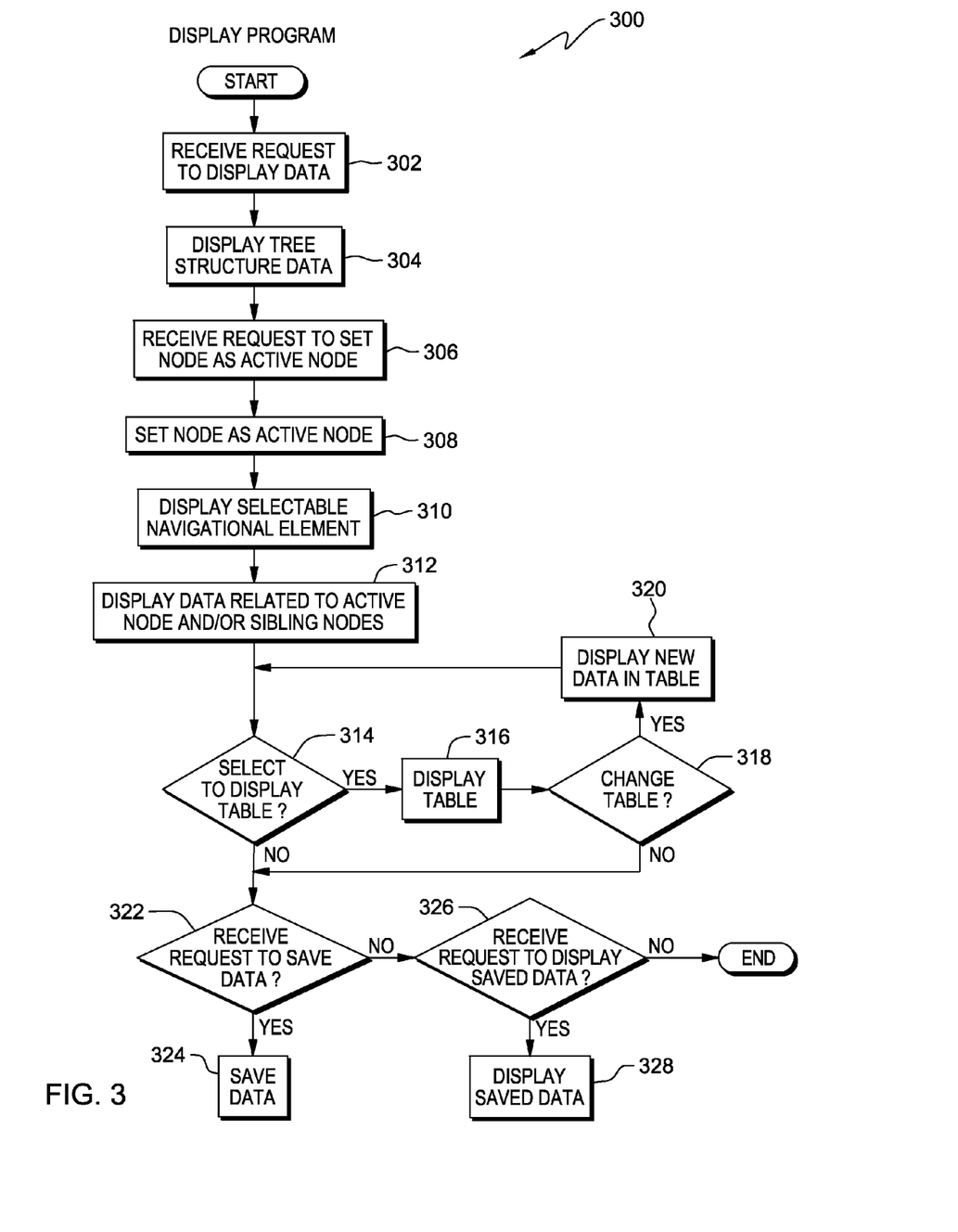
FIG. 3 is a flowchart of the steps of a data display program on the data processing system of FIG. 1, in accordance with an embodiment of the present invention.

FIG. 3 is a flowchart depicting the steps of data display program 300 for displaying data related to a selected node and/or sibling nodes, in accordance with an embodiment of the present invention.

Data display program 300 receives a request to display data (step 302) in UI 102, and in response, the data display program 300 displays data (step 304). Data may be displayed in organizational structures including tree structures, lists, tables, etc. In an example, the data is displayed on a first area of UI 102 in a hierarchical view within tree structure. The data is maintained in a database, and is organized and displayed in the tree structure. The tree structure includes a plurality of nodes that expand and/or collapse in response to a user selecting the nodes.

Data display program 300 receives input via UI 102 that at least one node has been selected (step 306). Responsive to the input, data display program 300 sets the selected node as an active node (step 308). When setting the node as an active node, the data display program 300 may indicate that the node is active by highlighting the active node.

In step 310, responsive to when a node is set as an active node, data display program 300 displays on the UI 102 a selectable display element including one or more selectable graphical elements. Additionally, in step 312, responsive to when a node is set as an active node, data display program 300 displays on UI 102 data related to the active node and/or one or more sibling nodes. In one example, the data display program 300 displays selectable display element in the first area, and displays the data related to the active node and/or one or more sibling nodes in a second area. Although the first and second areas do not overlap in this example, in other examples the different areas of the UI 102 may overlap.

Data display program 300 receives input via UI 102 that selectable graphical element has been selected (step 314). In step 316, data display program 300 displays data related to active node and/or one or more sibling nodes responsive to when a user selects selectable graphical element. In some examples, the data display program 300 displays data in a table format in which all of the rows of the table are similar leaf objects from which the graphical element was selected. The data displayed in the table format may include additional selectable graphical elements. In other examples, other formats of tables and other data representation models may be displayed when the graphical element is selected by the user. Although data display program 300 displays data in second area in this example, data may be displayed in other areas of UI 102.

In step 318, data display program 300 receives input via UI 102 that a user has selected at least one of the additional selectable graphical elements located in the table format to change the displayed data set without having to return to the view of the hierarchical structure. In one example, the selectable graphical elements are drop-down menus corresponding with the hierarchical structure in the first area.

In step 320, responsive to the input of step 318, data display program 300 displays data related to the active node and/or one or more sibling nodes. In some examples, the data display program 300 navigates back to the hierarchical structure in the first area, responsive to the input of step 318. Responsive to user selection of a selectable graphical element, the data display program 300 expands newly selected node in the hierarchical structure and designates the node active.

In step 322, data display program 300 receives a request to save data related to the active node and/or one or more sibling nodes. In step 324, data display program 300 saves the data related to the active node and/or one or more sibling nodes in a database of the computer or other form of storage device, responsive to the request to save from a user through UI 102. In one example, the saved data is in a table format, as it was displayed. However, in other examples, the saved data may be saved in other formats. In this example, the saved data is stored in the hierarchical structure in a node and is accessed through the UI 102.

In step 326, data display program 300 receives a request to display data related to the active node and/or one or more sibling nodes that was saved in the storage device. In step 328, responsive to a request to view saved data from a user through UI 102, the data display program 300 displays on UI 102 saved data. In an example, the saved data is displayed by the data display program 300 on UI 102 in the format that the data was saved. However, in other examples, the saved data is manipulated and displayed in other formats.

Figure 4:
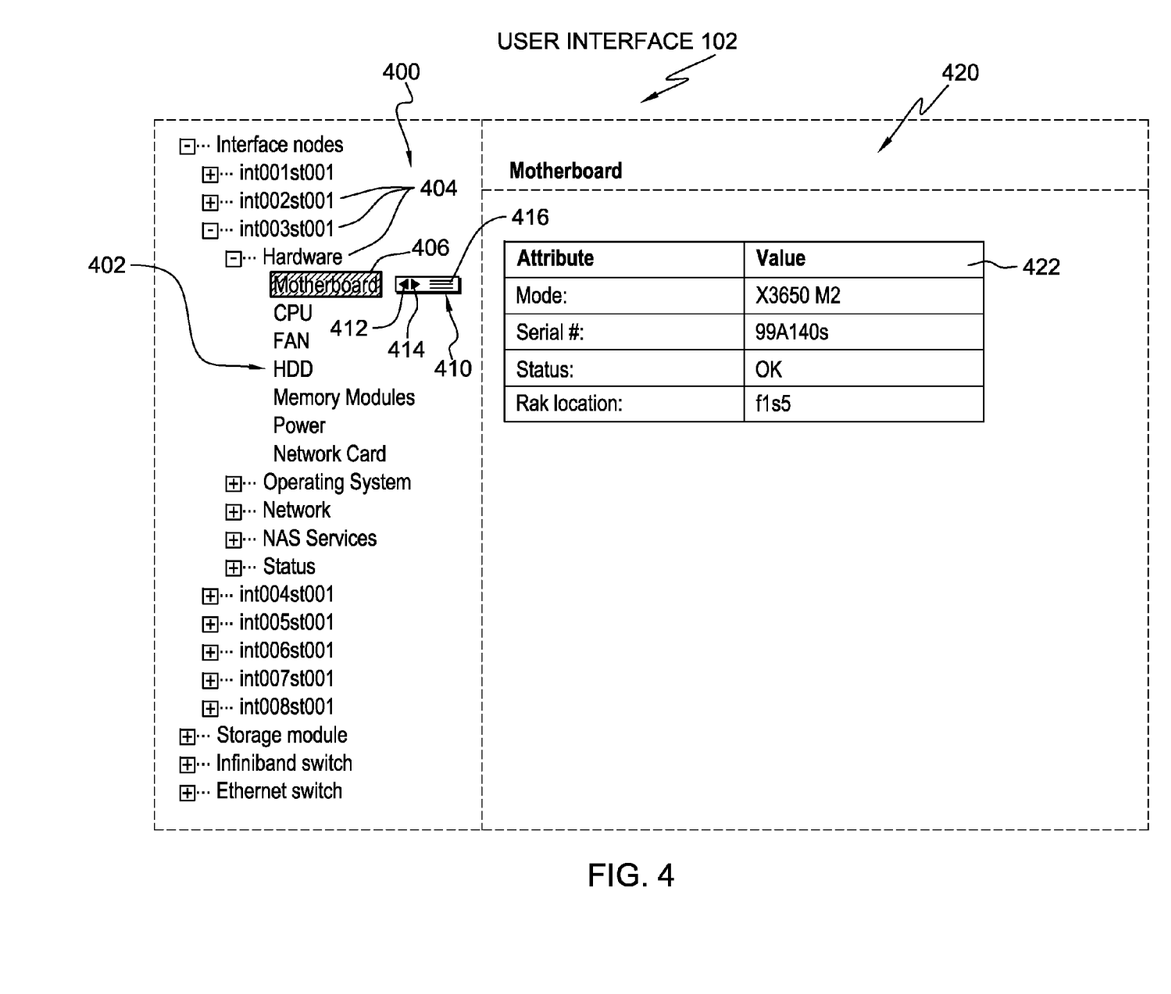
FIG. 4 depicts one example of a user interface display.

FIG. 4 depicts one embodiment of a display of UI 102, in accordance with an embodiment of the present invention. In the depicted embodiment, UI 102 is designed for a directory structure application. Briefly, a directory structure is the way an operating system's file system and its files are displayed to user. Files are typically displayed in a hierarchical tree structure. In other examples, the hierarchical tree structure is related to other forms of applications, including but not limited to: a system registry, a file folder system, and a database relationship structure. One such hierarchical tree structure 402 is displayed in a first area 400 of the UI 102, although other forms of hierarchical structures are used in other examples. Hierarchical tree structure 402 performs like known hierarchical tree structures with one or more nodes 404. Nodes 404 are collapsible and/or expandable and are used to represent connection points for node relationships within hierarchical tree structure 402. As such, when user selects a node, the node may either expand or collapse in response to the selection of the user through the UI 102. For example, node 404 connects a parent node to eight child nodes to five grandchild nodes, and so forth. The nodes may be expanded or collapsed to show relatively more or less information to the user on UI 102.

In one example, an active node 406 is selected. Active node 406 is designated as active node in this example by highlighting at least a portion of node. However, in other examples, node is designated as active node using other designations, including but not limited to: text formatting, spacial formatting around the node area, etc. After active node 406 is designated, UI 102 displays data related to active node and/or one or more sibling nodes in a second area 420. In this example, the data displayed relates to a motherboard.

In an example, UI 102 includes a selectable display element 410 that includes one or more selectable navigational elements that function to move between sibling nodes and/or one or more selectable graphical elements. In this example, selectable display element 410 includes a first selectable navigational element 412 and a second selectable navigational element 414. Selectable navigational elements 412 and 414 step forwards or backwards through the hierarchical tree structure responsive to when a user interacts with the UI 102 by selecting selectable navigational elements. A selectable graphical element 416 displays data related to active node 406 and/or one or more sibling nodes responsive to user selection. A graphical display 422 includes active node information in a table format in which all of the rows of the table are similar leaf objects from which the graphical element was selected.

Figure 5:
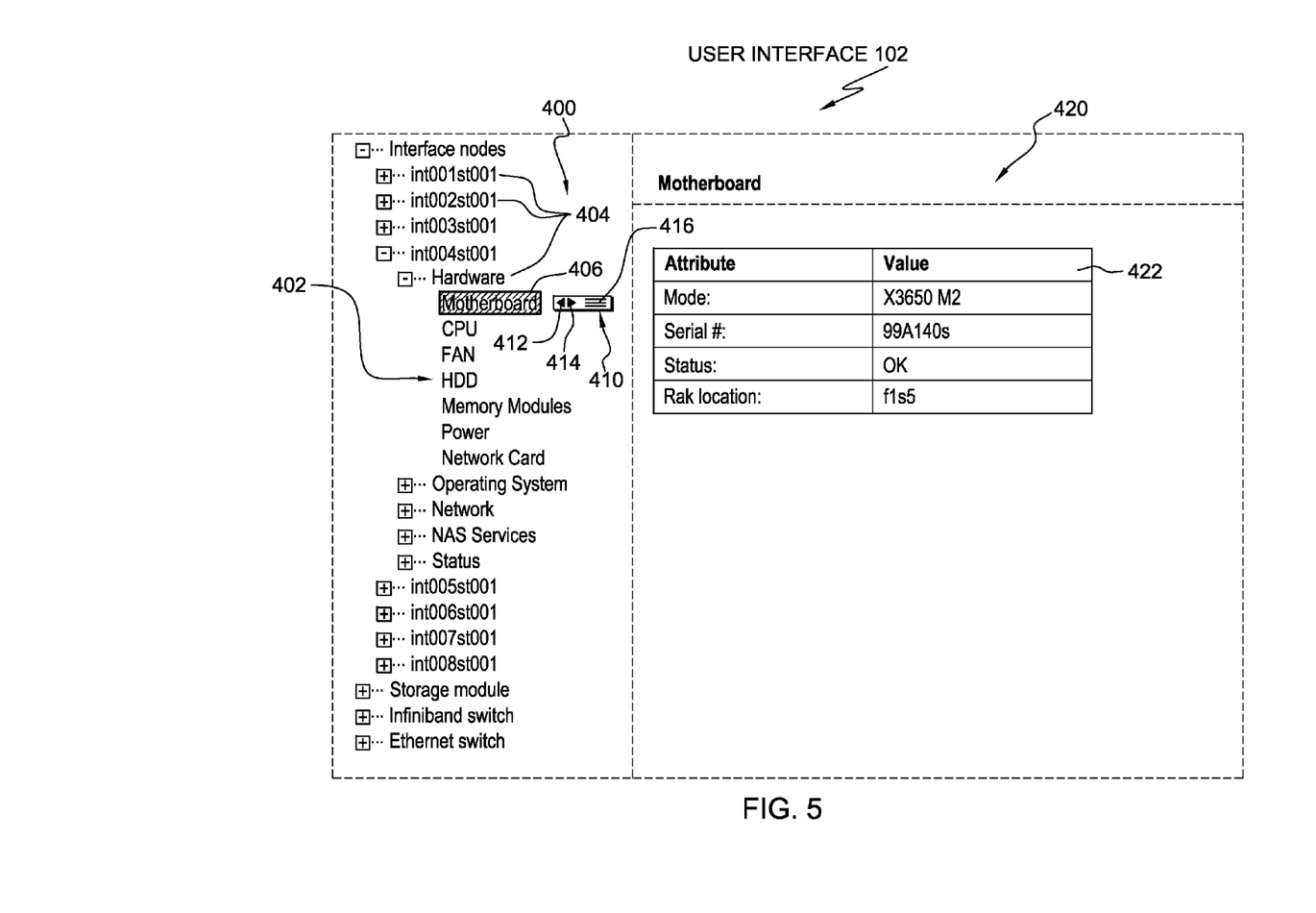
FIG. 5 depicts one example of a user interface display.

As depicted in FIGS. 4 and 5, responsive to when user interacts with the UI 102 by selecting second selectable navigational element 414, data navigational program 200 collapses active node 406 (node relating to interface node int003st001, in this example) and expands and displays similar data (data relating to the motherboard, in this example) in adjacent sibling node (node relating to interface node int004st001, in this example) down hierarchical tree structure 402, causing adjacent sibling node to become active node 406, depicted in FIG. 5. Additionally, in this example, when sibling node becomes new active node 406, the data related to new active node is displayed in second area 420.

Figure 6:
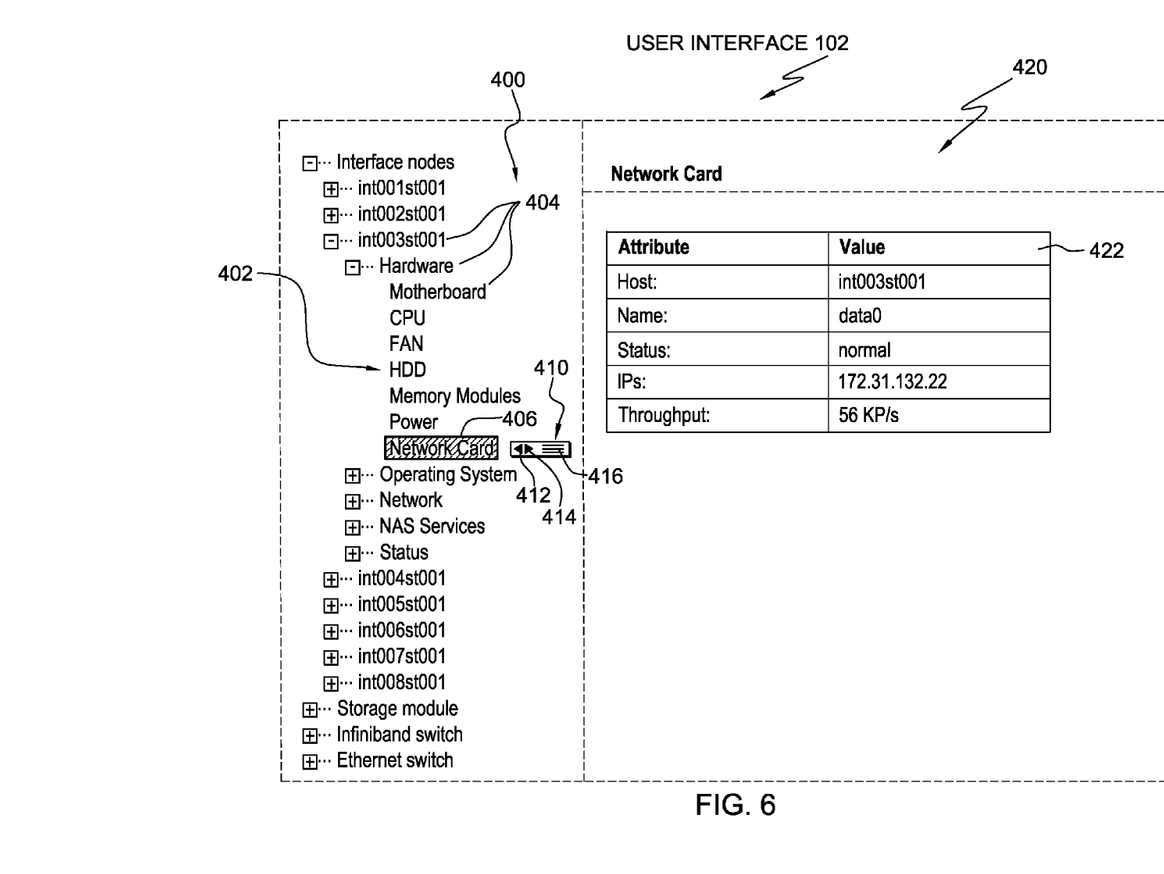
FIG. 6 depicts one example of a user interface display.

As depicted in FIGS. 5 and 6, in another example, responsive to when user interacts with the UI 102 by selecting first selectable navigational element 412, data navigational program 200 replaces active node 406 to the adjacent sibling node backwards the current active node 406 (from the node relating to the motherboard of interface node int004st001 to the network card of the interface node int004st001) and displays data related to adjacent sibling node up the tree structure 402, causing the adjacent sibling node to become active node 406, depicted in FIG. 6. In this example, since there is no adjacent sibling node located above the active node 406 of FIG. 5, the data navigational program cycles around to the bottom node of the branch, as depicted in FIG. 6. Additionally, in this example, when sibling node becomes new active node 406, the data related to new active node is displayed in second area 420. In this example, the data displayed relates to a network card.

In some examples, more selectable navigational elements may be included within selectable display element 410. In this regard, responsive to user selection, the data navigational program 200 may navigate between sibling nodes, such as depicted between FIGS. 5 and 6, in addition to navigating between sibling nodes, such as depicted between FIGS. 4 and 5.

Figure 7:
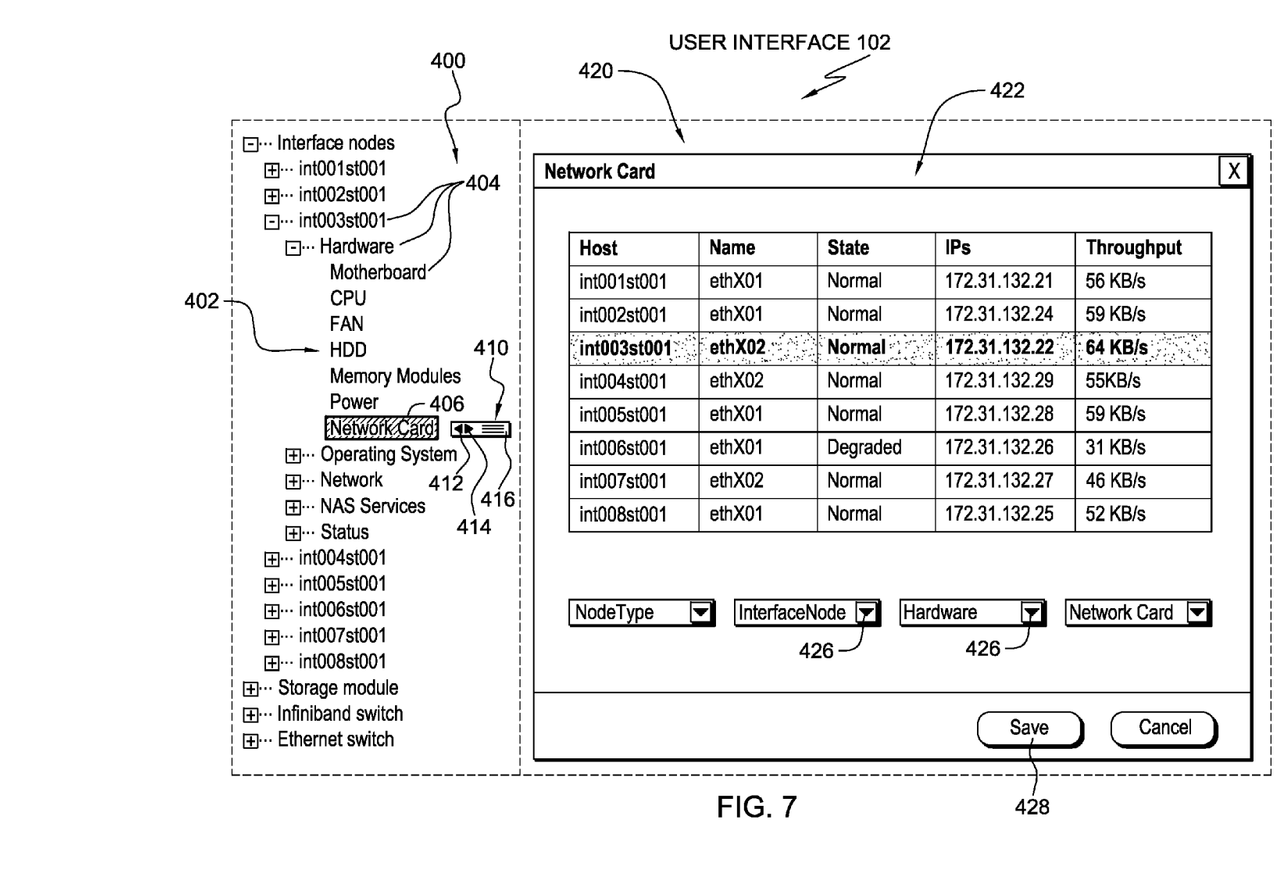
FIG. 7 depicts one example of a user interface display.

As depicted in FIG. 7, data display program 300 displays data related to active node 406 and/or one or more sibling nodes responsive to when a user selects selectable graphical element 416. In some examples, the data display program 300 displays data in a graphical display 422 with active node information in a table format in which all of the rows of the table are similar leaf objects from which the graphical element was selected. The data displayed in the table format may include additional selectable graphical elements 426. In other examples, other formats of tables and other data representation models may be displayed when the graphical element is selected by the user. Although data display program 300 displays data in second area in this example, data may be displayed in other areas of UI 102. A selectable element 428 of UI 102 saves data related to the active node and/or one or more sibling nodes in a storage device associated with computer, responsive to a request to save from user.

Figure 8:
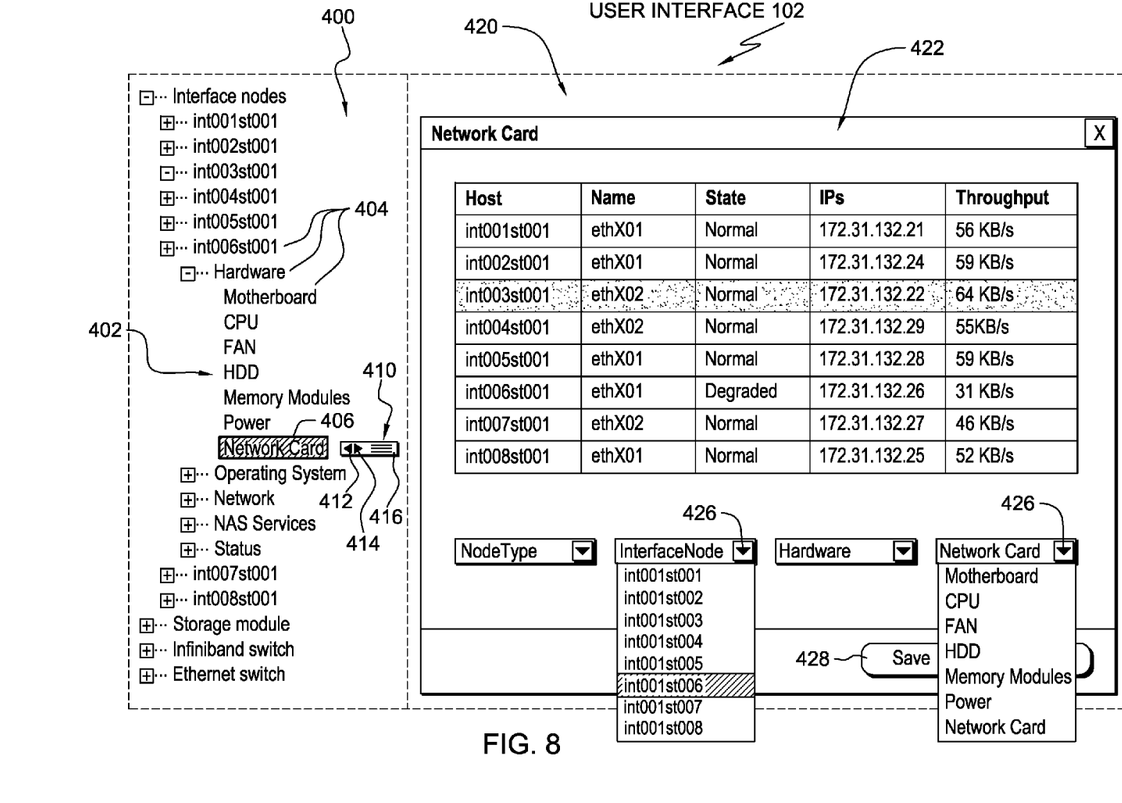
FIG. 8 depicts one example of a user interface display.

As depicted in FIG. 8, data display program 300 receives input via UI 102 that a user is selecting at least one of the additional selectable graphical elements 426 located in the table format to change the displayed data set without having to return to the view of the hierarchical tree structure 402. In this example, the additional selectable graphical elements 426 are drop-down menus corresponding with hierarchical tree structure 402 in the first area 400.

Figure 9:
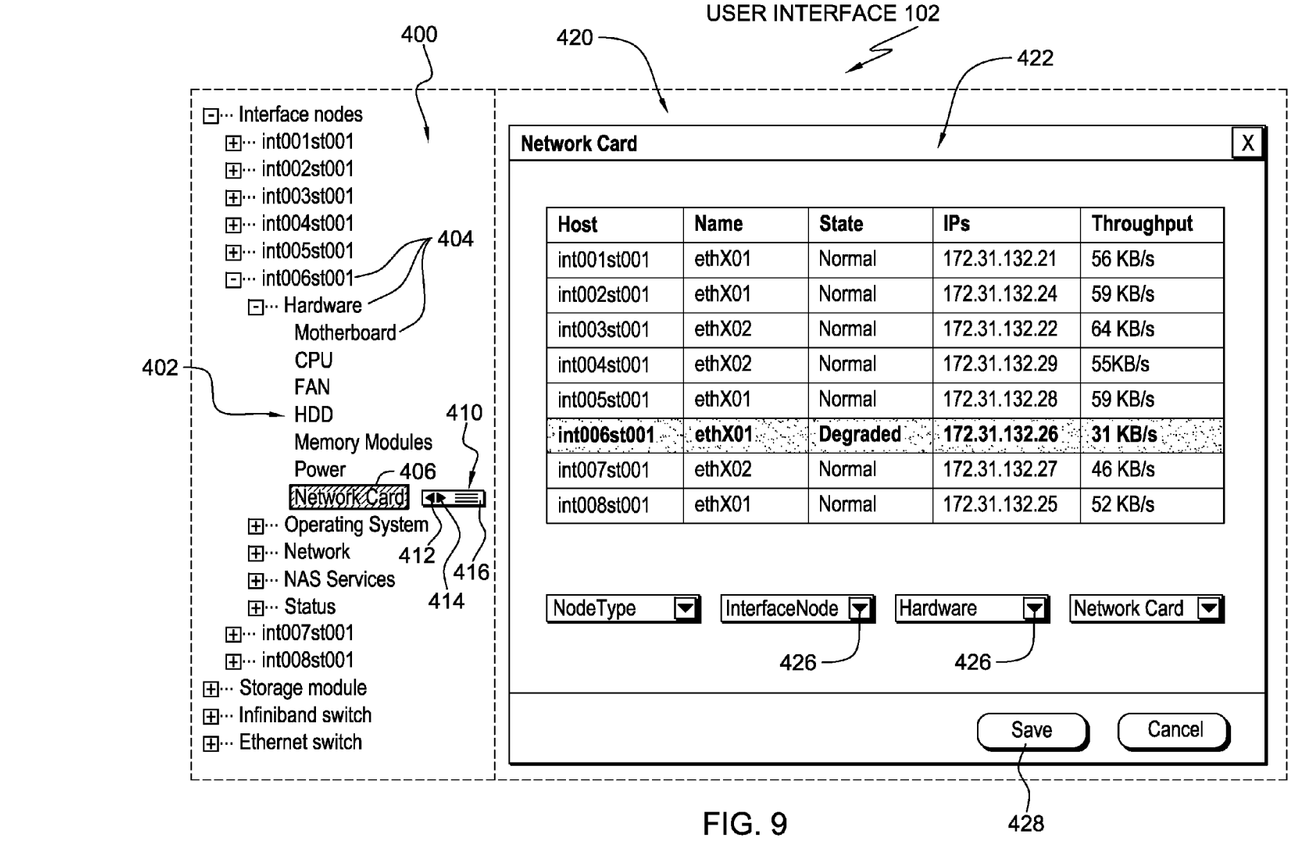
FIG. 9 depicts one example of a user interface display.

As depicted in FIG. 9, responsive to selection of additional selectable graphical element 426 data display program 300 displays data related to active node and/or one or more sibling nodes. In this example, responsive to user selection of additional selectable graphical element 426, the data display program 300 expands newly selected node in hierarchical tree structure 402 and designates node as new active node 406.

As depicted in FIG. 9, data display program 300 saves the data related to the active node and/or one or more sibling nodes in a storage device associated with computer, responsive to a request to save from a user through selectable element 428 of UI 102. The saved data is in a table format, as it was displayed. However, in other examples, the saved data may be saved in other formats. In this example, the saved data is stored in the hierarchical structure in a node and is accessed through the UI 102.

Figure 10:
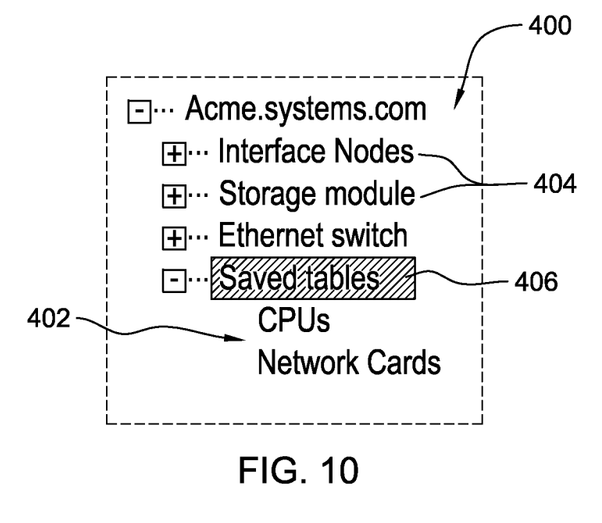
FIG. 10 depicts one example of a user interface display.

In an example, responsive to a request to view from a user through UI 102, the data display program 300 displays on UI 102 saved data. In this example, a node including the saved data is displayed by the data display program 300 in the hierarchical tree structure 402 of UI 102, as depicted in FIG. 10.

Figure 11:
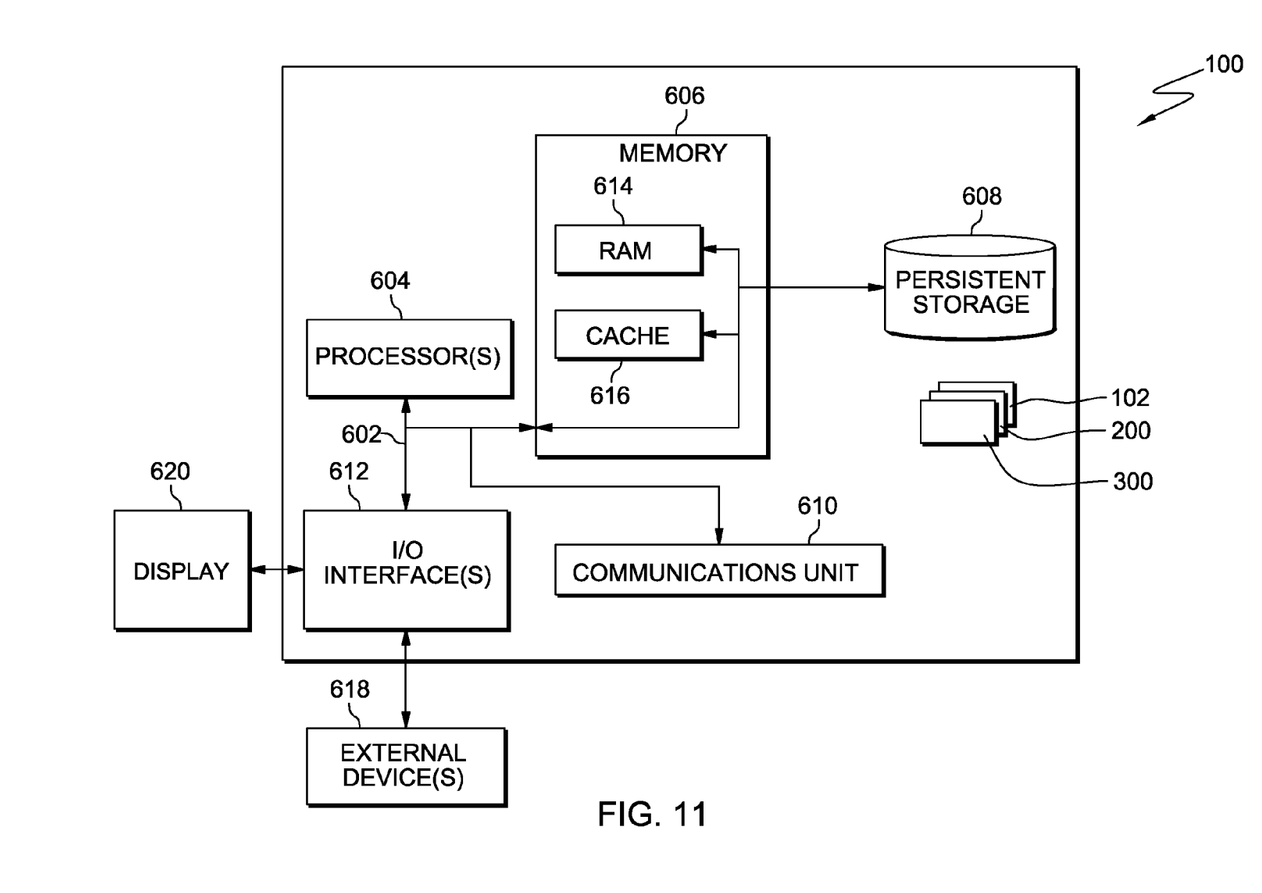
FIG. 11 depicts a block diagram of internal and external components of the data processing system of FIG. 1.

FIG. 11 depicts a block diagram of components of data processing system 100 in accordance with an illustrative embodiment. It should be appreciated that FIG. 11 provides only an illustration of one implementation and does not imply any limitations with regard to the environment in which different embodiments may be implemented. Many modifications to the depicted environment may be made.

Data processing system 100 includes communications fabric 602, which provides communications between processor(s) 604, memory 606, persistent storage 608, communications unit 610, and input/output (I/O) interface(s) 612.

Memory 606 and persistent storage 608 are examples of computer-readable tangible storage devices. A storage device is any piece of hardware that is capable of storing information, such as, data, program code in functional form, and/or other suitable information on a temporary basis and/or permanent basis. Memory 606 may be, for example, one or more random access memories (RAM) 614, cache memory 616, or any other suitable volatile or non-volatile storage device.

User interface 102, data navigational program 200, and data display program 300 are stored in persistent storage 608 for execution by one or more of the respective processors 604 via one or more memories of memory 606. In the embodiment illustrated in FIG. 11, persistent storage 608 includes flash memory. Alternatively, or in addition to, persistent storage 608 may include a magnetic disk storage device of an internal hard drive, a solid state drive, a semiconductor storage device, read-only memory (ROM), EPROM, or any other computer-readable tangible storage device that is capable of storing program instructions or digital information.

The media used by persistent storage 608 may also be removable. For example, a removable hard drive may be used for persistent storage 608. Other examples include an optical or magnetic disk that is inserted into a drive for transfer onto another storage device that is also a part of persistent storage 608, or other removable storage devices such as a thumb drive or smart card.

Communications unit 610, in these examples, provides for communications with other data processing systems or devices. In these examples, communications unit 610 includes one or more network interface cards. Communications unit 610 may provide communications through the use of either or both physical and wireless communications links. In another embodiment still, data processing system 100 may be devoid of communications unit 610. UI 102, data navigational program 200, and data display program 300 may be downloaded to persistent storage 608 through communications unit 610.

I/O interface(s) 612 allows for input and output of data with other devices that may be connected to data processing system 100. For example, I/O interface 612 may provide a connection to external devices 618 such as a keyboard, keypad, a touch screen, and/or some other suitable input device. I/O interface(s) may also connect to a display 620.

Display 620 provides a mechanism to display data to a user and may be, for example, a computer monitor.

Based on the foregoing, a method, computer system, and computer program product have been disclosed for presenting data within a tree structure to a user. However, numerous modifications and substitutions can be made without deviating from the scope of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. Therefore, the present invention has been disclosed by way of example and not limitation.

What is claimed is:

1. A method of presenting data within a tree structure, the method comprising:
    displaying on a user interface of a computer a hierarchical view of data within a tree structure that comprises a plurality of parent nodes, wherein one or more of the plurality of parent nodes contains at least one sub-node;
    receiving input via the user interface of the computer that at least one sub-node has been selected;
    setting by the computer the at least one sub-node that has been selected as an active node;
    displaying on the user interface of the computer a selectable display element comprising one or more selectable navigation elements for navigating between substantially similar sub-nodes of sibling parent nodes, responsive to selecting the at least one sub-node as an active node, wherein the substantially similar sub-nodes have a substantially similar type of information, and wherein each of the one or more selectable navigation elements is a selectable element that is not a node; and
    displaying on the user interface of the computer data related to the active node.

2. The method of claim 1, wherein the selectable display element comprises a first selectable navigational element for stepping forward through the tree structures between substantially similar sub-nodes of sibling parent nodes and a second selectable navigational element configured to step backward though the tree structure between substantially similar sub-nodes of sibling parent nodes.

3. The method of claim 1, wherein the selectable display element comprises a selectable graphical element for displaying on the user interface of the computer data related to the active node or one or more substantially similar sub-nodes of sibling parent nodes, responsive to the selectable graphical element being selected by the user.

4. The method of claim 3, wherein the data related to the active node or one or more substantially similar sub-nodes of sibling parent nodes is in a table format.

5. The method of claim 1, further comprising:
    responsive to the selectable display element being selected by the user, displaying on the user interface of the computer data related to the active node or one or more substantially similar sub-nodes of sibling parent nodes.

6. The method of claim 1, further comprising:
    responsive to the selection of a selectable navigational element, collapsing the computer data related to the active node; and
    displaying similar data related to a substantially similar sub-node of a sibling parent node in the tree structure.

7. The method of claim 1, wherein the active node is highlighted.

8. The method of claim 1, wherein the tree structure is selected from a list consisting of: a directory structure, a system registry, a file folder system, and a database relationship structure.

9. The method of claim 1, wherein the plurality of parent nodes comprise collapsible and expandable elements, wherein each of the plurality of parent nodes is associated with one of the plurality of collapsible and expandable elements, and wherein each of the collapsible elements is configured to expand and collapse hierarchical connections between the plurality of parent nodes.

10. A computer program product for presenting data within a tree structure to a user, the computer program product comprising:
    one or more computer-readable tangible storage devices and program instructions stored on at least one of the one or more storage devices, the program instructions comprising;
    first program instructions that display on a user interface of a computer a hierarchical view of the data within a tree structure, wherein the tree structure comprises a plurality of parent nodes, and wherein one or more of the plurality of parent nodes contains at least one sub-node;
    second program instructions that receive input via the user interface of the computer that at least one sub-node has been selected, wherein the computer instructions set the at least one sub-node that has been selected as an active node;
    third program instructions that display on the user interface of the computer, responsive to the at least one sub-node being selected as an active node, a selectable display element comprising one or more selectable navigation elements for navigating between substantially similar sub-nodes of sibling parent nodes, wherein the substantially similar sub-nodes have a substantially similar type of information, and wherein each of the one or more selectable navigation elements is a selectable element that is not a node; and
    fourth program instructions that display on the user interface of the computer data related to the active node.

11. The computer program product of claim 10, wherein the selectable display element comprises a first selectable navigational element for stepping forward through the tree structures between substantially similar sub-nodes of sibling parent nodes and a second selectable navigational element for stepping backward though the tree structure between substantially similar sub-nodes of sibling parent nodes.

12. The computer program product of claim 10, wherein the selectable display element comprises a selectable graphical element for displaying on the user interface of the computer data related to the active node or one or more substantially similar sub-nodes of sibling parent nodes, responsive to the selectable graphical element being selected by the user.

13. The computer program product of claim 12, wherein the fourth program instructions that display the data related to the active node or related to the one or more substantially similar sub-nodes of sibling parent nodes is in a table format.

14. The computer program product of claim 10, further comprising:
fifth program instructions that collapse the active node and the data related to the active node and display a substantially similar sub-node of a sibling parent node and data related to the substantially similar sub-node, responsive to the selection of a first selectable navigational element.

15. The computer program product of claim 10, further comprising:
fifth program instructions that collapse the active node and the data related to the active node and display a substantially similar sub-node of a sibling parent node and data related to the substantially similar sub-node, responsive to the selection of a first selectable navigational element.

16. The computer program product of claim 10, wherein the third program instructions visually highlight the active node.

17. The computer program product of claim 10, wherein the tree structure is chosen from a list consisting of: a directory structure, a system registry, a file folder system, and a database relationship structure.

18. The computer program product of claim 10, wherein the plurality of parent nodes comprise collapsible and expandable elements, wherein each of the plurality of parent nodes is associated with one of the plurality of collapsible and expandable elements, and wherein each of the collapsible elements is configured to expand and collapse hierarchical connections between the plurality of parent nodes.

19. A computer system for presenting data within a tree structure to a user, the computer system comprising:
one or more processors, one or more computer-readable memories and one or more computer-readable tangible storage devices;
first program instructions, stored on at least one of the one or more storage devices for execution by at least one of the one or more processors via at least one of the one or more memories, that display on a user interface of a computer a hierarchical view of the data within a tree structure, wherein the tree structure comprises a plurality of parent nodes, wherein one or more of the plurality of parent nodes contains at least one sub-node;
second program instructions, stored on at least one of the one or more storage devices for execution by at least one of the one or more processors via at least one of the one or more memories, that receive input via the user interface of the computer that at least one sub-node has been selected, wherein the computer instructions set the at least one sub-node that has been selected as an active node;
third program instructions, stored on at least one of the one or more storage devices for execution by at least one of the one or more processors via at least one of the one or more memories, that display on the user interface of the computer, responsive to the at least one sub-node being selected as an active node, a selectable display element comprising one or more selectable navigation elements for navigating between substantially similar sub-nodes of sibling parent nodes, responsive to selecting the at least one sub-node as an active node, wherein the substantially similar sub-nodes have a substantially similar type of information, and wherein each of the one or more selectable navigation elements is a selectable element that is not a node; and
fourth program instructions, stored on at least one of the one or more storage devices for execution by at least one of the one or more processors via at least one of the one or more memories, that display on the user interface of the computer data related to the active node.

20. The computer system of claim 19, wherein the selectable display element comprises a first selectable navigational element for stepping forward through the tree structures between substantially similar sub-nodes of sibling parent nodes and a second selectable navigational element for stepping backward though the tree structure between substantially similar sub-nodes of sibling parent nodes.

* * * * *